Figure 1:
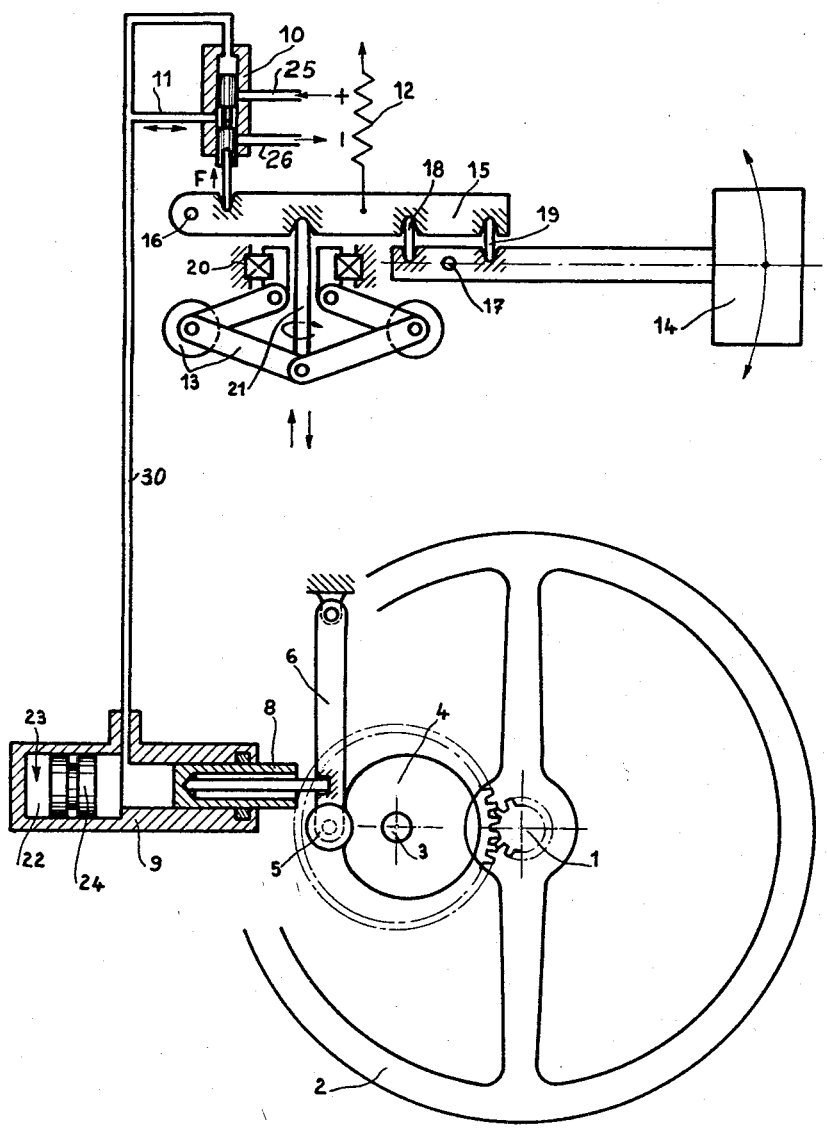

March 2, 1965  E. HENRY-BIABAUD  3,171,298

VEHICLE STEERING ARRANGEMENT

Filed Nov. 14, 1961  2 Sheets-Sheet 1

United States Patent Office 3,171,298
Patented Mar. 2, 1965

3,171,298
VEHICLE STEERING ARRANGEMENT
Edmond Henry-Biabaud, Paris, France, assignor to Societe Anonyme Andre Citroen, Paris, France, a French corporation
Filed Nov. 14, 1961, Ser. No. 152,192
Claims priority, application France, Nov. 21, 1960, 844,566
10 Claims. (Cl. 74—495)

It is known how to facilitate the operation of steering systems of automotive vehicles by equipping such systems with members adapted to provide the whole or part of the force necessary for this operation.

These so-called servo-action devices should be adapted to combine a smooth operation at low speeds with a desirable firmness at high speeds. Therefore, they are usually a comprise between these contradictory requirements.

A servo-action device for the purpose specified and having the optimum properties should meet the following requirements. The driver should be able to steer the wheels without effort even on the spot, the steering wheel should rotate smoothly when driving at low speeds and in mountain driving while becoming gradually "harder" as a function of the velocity of the vehicle in order properly to center the steering and prevent untimely movements of the driver from causing the vehicle to deviate from its normal path. It is also essential that the steering wheel returns automatically at any time to its straight ahead position. Therefore, some means must be provided whereby the value of the efforts applied to the steering wheel may be adjusted as a function of all the parameters or factors likely to affect the result, notably the steering angle, vehicle speed, centrifugal force, personal factor, etc.

The device constituting the subject-matter of this invention is applicable to conventional reversible servo-action steering systems, that is, those transmitting to the driver one fraction of the reactions produced by the road on the wheels, but in addition it is capable of giving an "artificial" feeling to the driver in that nothing of what happens along the road surface is felt by the driver, thus adding greatly to the driving comfort and safety. In this case, the steering effort, when the vehicle is still, may become practically zero.

According to this invention, in a servo-action steering system which may be of any suitable type and notably of a type wherein the force necessary for actually steering the wheels is supplied from an auxiliary source of power, the effort for actuating the steering wheel proper being limited to that necessary for displacing a control member for steering the road wheels in one or the other direction, there is associated a device exerting on the steering column a resistance to steering rotation which is proportional to the angle of rotation and preferably also to other factors such as the road speed of the vehicle and the centrifugal force to which the vehicle is subjected in a curve, whereby the driver may feel in the steering wheel a resistance complementary to that exerted by the servo-action device proper, this resistance being due not to the frictional contact between the wheels and the road surface but to certain predetermined parameters. According to a preferred embodiment of the present invention this device consists of a cam rotatably driven from the steering wheel and engaged by a follower urged thereagainst by a pneumatic or hydraulic device responsive to a variable pressure, whereby adequate members are provided for varying this pressure, at will, as a function of predetermined factors or parameters.

With the foregoing and other objects in view, the invention resides in the novel arrangement and combination of parts and in the details of construction hereinafter described and claimed, it being understood that changes in the precise embodiment of the invention herein disclosed may be made within the scope of what is claimed without departing from the spirit of the invention.

Figure 2:
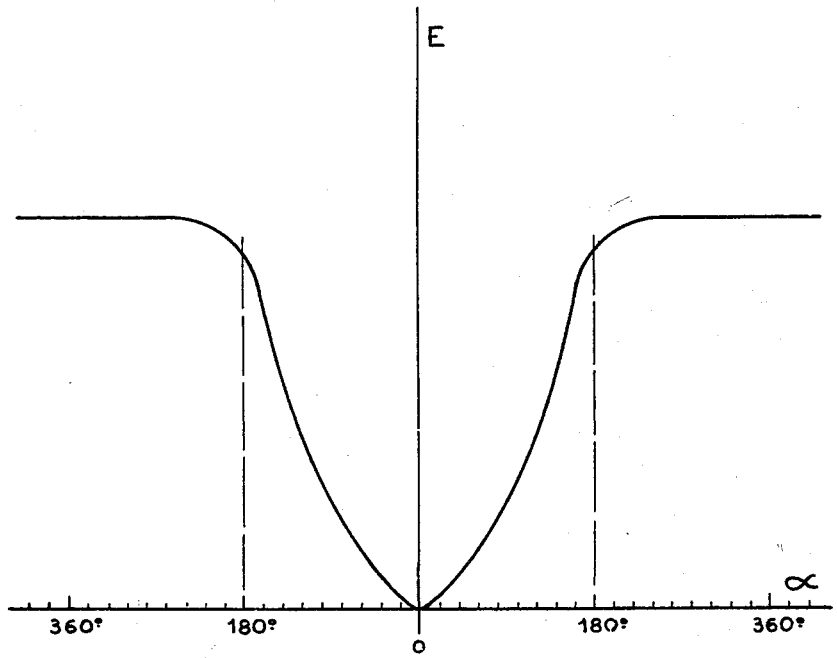

Other objects and advantages will become apparent from the following description taken in conjunction with the accompanying drawing in which:

FIGURE 1 is a diagrammatical illustration of the relative arrangement of the component elements of a servo-action steering system according to this invention, and FIGURE 2 is a curve plotting the resistance exerted by the steering wheel as a function of the angle of rotation.

Referring to the drawing, the reference numeral 1 designates the steering shaft on which the steering wheel 2 is mounted, this shaft 1 coacting for steering the wheels with a servo-action mechanism (not shown) which is not described in detail as it may pertain to one of the many types well known to those conversant with the art.

A cam 4 is solid with a shaft 3 extending parallel to the shaft 1 and this shaft 3 is driven from the column 1 through a pinion-and-gear or like transmission providing such a ratio that the shaft 3 performs only a half revolution when the steering wheel 2 rotates from its straight ahead position to its complete or maximum steering position either left or right.

A roller or like follower 5 engages the cam contour so as to be responsive to all the movements of this cam. Thus, the roller 5 may be mounted on the free end of an arm 6 pivoted on a fixed pin 7. This arm 6 is responsive to the thrust exerted by a fluid on a piston 8 slidably mounted in a cylinder 9.

Under these circumstances it will be readily appreciated that for a given pressure the variation in the effort to be exerted on the wheel for turning same from left to right or vice-versa depends on the cam configuration, therefore, this cam will be designed according to the desired result. In FIG. 2 there is illustrated by way of example a typical effort curve E as a function of the steering angle $\alpha$ selected for a given vehicle.

It will be readily understood that by varying the fluid pressure above the piston 8 it is possible to vary at will the effort to be exerted on the steering wheel without altering the pattern of the curve provided by the cam 4. In vehicles equipped with a pressure-fluid generator the latter may be connected to the cylinder 9 through a pressure adjusting device of known type such as 10 giving in the line 11 a pressure proportional to the force applied in the direction F. This device 10 communicates with the line 25 delivering fluid under pressure and with the return to the reservoir 26.

The force F may be the resultant of a plurality of forces, for example a fixed or adjustable force (in this last case the adjustment will be effected by the driver to suit specific driving requirements) obtained through the spring 12. A force subordinate to the vehicle speed is illustrated diagrammatically in this case by a mechanical device for example in the form of a governor 13. A force proportional to the centrifugal force developed in curves and illustrated herein in the form of a pendulum 14 giving an effort of same direction irrespective of the direction of the curve.

The three forces set forth hereinabove are transmitted in the arrangement illustrated through the medium of lever 15 fulcrumed on a fixed point 16. The pendulum 14 oscillates about the pin 17 and transmits the centrifugal force through link 18 or 19, according to the direction of turn.

The device 13 of which the movement of rotation is subordinate to the velocity of the vehicle is shown for illustrating the function through a system of inertia weights and arms revolving in a bearing 20. The centrifugal reaction of the rotary weights is transmitted to lever 15 through a rod 21. Therefore, this force is proportional to the square of the vehicle speed. Experimentally, it has been observed that this variation according to this law is not convenient and that a more linear variation should be adhered to. Now this can easily be achieved by anybody conversant with the art; obviously, the transmission is through a device for transforming motion of a type adapted to provide this result, for example a cam, and therefore any further detailed description is not deemed necessary.

The device 9 receives the fluid under pressure, this pressure being adjusted by the slide valve 10 as a function of the resultant value F. In the bottom of this slide valve an elastic chamber 22 may be filled with compressed gas 23 exerting its pressure on a separator piston 24, but a spring may be substituted for this gas.

With the device described hereinabove with reference to the accompanying drawing a steering system is obtained wherein all the usual compromises are safely avoided. The parameters utilized in its operation may be adjusted separately to provide the desired final result. Of course, the device for adjusting F as a function of speed is proposed by way of example only, thus, to complete the description and illustration of the specific embodiment of the invention a centrifugal device has been shown in the drawing, but any other adequate device may be substituted therefor, such as an electromagnet receiving energizing current from a tachometric generator.

To illustrate the influence of centrifugal force in a curve, a pendulum has been shown in the drawing, but it is also possible, without departing from the spirit and scope of the invention, to transmit to the lever 15 an effort proportional to the inclination of the vehicle, for example a proportional effort obtained by utilizing the angle of torsion produced in one of the stabilizing bars currently equipping modern cars.

Although the present invention has been described in conjunction with a preferred embodiment, it is to be understood that modifications and variations may be resorted to without departing from the spirit and scope of the invention, as those skilled in the art will readily understand. Such modifications and variations are considered to be within the purview and scope of the invention and appended claims.

I claim:

1. A steering arrangement for an automotive vehicle comprising a steering shaft rotatably mounted upon said vehicle, a steering wheel fixed to said shaft for manually rotating said steering shaft, a second shaft rotatably mounted upon said vehicle extending parallel to said steering shaft, a cam fixed to said second shaft, means operatively connected to said first shaft and said second shaft for rotating said second shaft and said cam by said steering shaft at reduced speed, a lever pivotally mounted upon said vehicle, a roller rotatably mounted upon said lever frictionally engaging said cam, means acting upon said lever urging said roller against said cam to exert a resistance against rotation of said cam and controlling means operatively cooperating with said roller, said controlling means being controlled by various parameters of said vehicle to vary said resistance.

2. A steering arrangement as set forth in claim 1, wherein said controlling means comprises a speed governor.

3. A steering arrangement as set forth in claim 1, wherein said means for rotating said second shaft comprises a pinion on said steering shaft and a gear on said second shaft meshing wtih said pinion.

4. A steering arrangement as set forth in claim 1 wherein said controlling means comprises a lever pivotally mounted on said vehicle upon which said roller is rotatably mounted, a cylinder, a piston in said cylinder cooperating with said lever and a fluid pressure system connected to said cylinder controlling the movements of said piston.

5. A steering arrangement as set forth in claim 4 wherein the pressure of said fluid in said cylinder is controlled by the vehicle speed and by centrifugal force when said vehicle is steered along an arc.

6. A steering arrangement as set forth in claim 4 wherein a slide valve communicating with a supply of fluid under pressure controls said fluid pressure systems to increase or reduce said pressure in said cylinder.

7. A steering arrangement as set forth in claim 6, wherein said slide valve is manually adjustable.

8. A steering arrangement as set forth in claim 4, wherein resilient means cooperating with said piston are provided in said cylinder.

9. A steering arrangement as set forth in claim 8 wherein said resilient means comprises an elastic chamber filled with gas and said resilient means is separated from the fluid of said pressure system by a movable piston.

10. A steering arrangement for an automotive vehicle comprising a steering shaft rotatably mounted upon a vehicle, a steering wheel fixed to said shaft for manually rotating said steering shaft, a second shaft rotatably mounted upon said vehicle extending parallel to said steering shaft, a cam fixed to said second shaft, means operatively connected to said first shaft and said second shaft for rotating said second shaft and said cam by said steering shaft at reduced speed, a lever pivotally mounted upon said vehicle adjacent said cam, a roller rotatably mounted upon said lever frictionally engaging said cam, means acting upon said lever for urging said roller to exert a resistance against the rotation of said cam and means cooperating with said lever controlled by various parameters of said vehicle to vary said resistance.

References Cited by the Examiner
UNITED STATES PATENTS

| 2,217,596 | 10/40 | Munschauer | 74—592 |
| 2,862,722 | 12/58 | Brueder | 74—495 X |
| 2,887,905 | 5/59 | Reynolds | 74—84 |
| 3,084,566 | 4/63 | Pistillo | 74—495 |

BROUGHTON G. DURHAM, *Primary Examiner.*